United States Patent
Startchik

(10) Patent No.: US 8,885,947 B2
(45) Date of Patent: Nov. 11, 2014

(54) METHOD FOR MARKING GRAPHICAL ELEMENTS AND METHOD FOR DETECTING SAID MARKING IN A GRAPHICAL ELEMENT

(75) Inventor: Sergei Startchik, Geneva (CH)

(73) Assignee: Anteleon Imaging Sarl, Geneva (CH)

(*) Notice: Subject to any disclaimer, the term of this patent is extended or adjusted under 35 U.S.C. 154(b) by 9 days.

(21) Appl. No.: 13/820,807

(22) PCT Filed: Sep. 6, 2010

(86) PCT No.: PCT/IB2010/002211
§ 371 (c)(1),
(2), (4) Date: May 3, 2013

(87) PCT Pub. No.: WO2012/032367
PCT Pub. Date: Mar. 15, 2012

(65) Prior Publication Data
US 2013/0208988 A1     Aug. 15, 2013

(51) Int. Cl.
*G06K 9/48* (2006.01)
*G06T 1/00* (2006.01)

(52) U.S. Cl.
CPC ............... *G06K 9/48* (2013.01); *G06T 1/0064* (2013.01); *G06T 2201/0051* (2013.01); *G06T 2201/0062* (2013.01)
USPC ...................................................... 382/200

(58) Field of Classification Search
USPC ....................................................... 382/200
See application file for complete search history.

(56) References Cited

U.S. PATENT DOCUMENTS

| | | | |
|---|---|---|---|
| 5,081,685 A * | 1/1992 | Jones et al. | 382/105 |
| 6,983,056 B1 | 1/2006 | Amano | |
| 2005/0039021 A1 | 2/2005 | Alattar et al. | |
| 2009/0039583 A1 * | 2/2009 | Horn et al. | 270/1.02 |
| 2009/0232352 A1 | 9/2009 | Carr et al. | |

FOREIGN PATENT DOCUMENTS

EP     1835718 A1     9/2007

OTHER PUBLICATIONS (Jonathan Su, "Digital Watermarking of Text, Image and Video Documents", 1998, Comput. & Graphivs, vol. 22, No. 6, pp. 687-695).*

(Continued)

*Primary Examiner* — Stephen R Koziol
*Assistant Examiner* — Totam Le
(74) *Attorney, Agent, or Firm* — Cooper Legal Group, LLC

(57) ABSTRACT

Method for marking graphical elements comprising the steps of selecting at least three coherent edge portions (6) of a graphical element (1), wherein the relative orientation of the coherent edge portions (6) is constant and/or smoothly varies along their entire length, the coherent edge portions (6) comprising at least two reference edge portions (66) and one edge portion to mark (67); defining a family of smooth and non-intersecting curves (65), said curves (65) intersecting all of the coherent edge portions (66, 67); shifting the edge portion to mark (67) along the curves (65) relative to the reference edge portions (66); and method for detecting a marking in a graphical element, comprising the steps of locating an encoding area (7) in a digital image of a graphical element (1); retrieving at least two reference edge portions (66) and at least one modified edge portion (68) of the encoding area (7) in the digital image; and determining the relative position of the modified edge portion (68) relative to the reference edge portions (66).

13 Claims, 12 Drawing Sheets

(56) References Cited

OTHER PUBLICATIONS (Young-Won Kim, "Watermarking Text Document in images using Edge Direction histograms", 2004, Elsevier).*

International Search Report dated Jun. 1, 2011.
Schmucker M: "Using Musical Features for watermarking music scores", Web Delievering of Music, 2001. Proceedings. First International Conference on Nov. 23-24, 2001, Piscataway NJ, USA, IEEE, Nov. 23, 2001; pp. 28-35.

* cited by examiner

METHOD FOR MARKING GRAPHICAL ELEMENTS AND METHOD FOR DETECTING SAID MARKING IN A GRAPHICAL ELEMENT

FIELD OF THE INVENTION

The present invention relates to a method for marking graphical elements and to a corresponding method for detecting and/or decoding said marking. The present invention relates in particular to a method for marking graphical elements like text, brand names, logos and/or graphical decorations present for example on commercial objects or packages, in order to store information in these graphical elements, and to a method for retrieving said information.

BACKGROUND OF THE INVENTION

Marking of graphical elements is used to label these elements, bearing them with information that can be used for a variety of tasks like track and trace, security, inventory, expiration date controlling, chemical composition, place of manufacturing, etc. The modifications of the graphical elements are preferably done at a scale much smaller than the graphical elements' size and are thus preferably not perceptible to a human eye. Accessing the information stored in the marked graphical elements is achieved by taking images of these graphical elements with a camera and processing the images, for example electronically, in order to determine the nature and/or the amplitude of the marking that was done, i.e. the nature and/or the amplitude of the differences between the marked graphical element and the original one.

Graphical elements including brand names, graphical decorations, text, etc. are present for example on commercial products and/or on their packages. The application of a graphical element on a product or a package usually starts with a step of digital designing in which the graphical element is encoded as a digital file, for example a vector format or an image file, followed by steps of preprocessing, rasterization and printing, or application by any other suited method, of the graphical element on a surface.

The marking of the graphical element can be done at any of the above steps, but preferably at the step of digital designing. The steps of a typical method 54 for applying a marked graphical element and of a typical method 55 for detecting the marking and retrieving the stored information are schematically illustrated in FIG. 12. In a step of modifying the graphical element 50, the original digital file 49 representing the graphical element, for example a vector format file, is modified with the help of an editing software, in order to store information in the thus marked graphical element. This step of modifying the graphical element 50 is usually followed by a step of preprocessing for printing 51 and then by a step of printing 53 for actually applying the graphical element on a physical support such as for example a product and/or its package.

Once the product or package is produced, the graphical element on its surface contains the marking, and thus some piece of information, that can be read during a verification and/or decoding process 55. This process includes the steps of taking an image 56 of the graphical element, analyzing the image 57 and extracting the information stored in the marked graphical element 58.

Patent application US 2005/0039021 A1 describes a marking method, wherein marking is applied to text only and corresponds to changing spaces between words according to a specified grid. This method can thus not be applied for example to brand names consisting of a single word. Furthermore, this method does not allow a robust detection when the marked text is applied on a curved surface and/or when the text is distorted because of a stretching of its support, for example.

Patent application US 2009/0232352 A1 describes a marking method, wherein the graphical information is treated as an image and marking is performed on a global basis, which is not appropriate for preserving (?) smooth and clean edges of the marked (?) graphical elements.

An aim of the present invention is to provide a method for marking graphical elements, wherein the modification of the graphical elements is preferably invisible to human eye in order for example to not alter the brand's impact and/or to not be easily detectable, the presence of the marking being preferably only detectable with the help of appropriate image processing tools.

Another aim of the present invention is to provide a method for marking graphical elements and a corresponding method for detecting said marking that are robust to quality reduction or other possible deformations due to the printing process of the graphical elements and/or to later deteriorations of the surfaces bearing the graphical elements.

Another aim of the present invention is to provide a method for marking graphical elements and a corresponding method for detecting said marking that allow detecting the marking and recovering the information stored therein irrespectively of the curvature of the surface on which the graphical element is applied.

Still another aim of the present invention is to provide a method for marking graphical elements and a corresponding method for detecting said marking allowing for a simple and robust detection of the marking with camera-enabled mobile devices.

SUMMARY OF THE INVENTION

These aims are achieved by a method for marking graphical elements and by a method for detecting said marking comprising the features of the corresponding independent claim.

These aims are achieved in particular by a method for marking graphical elements comprising the steps of selecting at least three coherent edge portions of a graphical element, wherein the relative orientation of the coherent edge portions is constant and/or smoothly varies along their entire length, the coherent edge portions comprising at least two reference edge portions and one edge portion to mark; defining a family of smooth and non-intersecting curves, said curves intersecting all of the coherent edge portions; shifting the edge portion to mark along the curves relative to the reference edge portions.

These aims are also achieved in particular by a method for detecting a marking in a graphical element, comprising the steps of locating an encoding area in a digital image of a graphical element; retrieving at least two reference edge portions and at least one modified edge portion of the encoding area in the digital image; and determining the relative position of the modified edge portion relative to the reference edge portions.

According to the method of the invention for marking graphical elements, a subset of edge portions, or edges, of a graphical element is used for marking the graphical element and another subset of edge portions, or edges, of the same graphical element is used as a geometric reference, thus allowing for a compensation of possible deformations, stretching or other transformations when detecting the marking and/or retrieving the information stored in the marked graphical element.

The modifications introduced when marking the graphical elements furthermore correspond to the shift of some edge portions to mark relative to reference edge portions in a way that is robust to stretching in any direction or to semi-local deformations of the graphical elements.

The scale of the modifications to the graphical elements is preferably below a few percents of their global size and is thus not perceptible to a human eye. At the same time, the scale of modifications is preferably above the printing precision scale.

Areas where edge portion shifting can be detected with sufficient robustness are selected for marking. According to an embodiment of the invention, the step of selecting coherent edge portions is repeated, thus allowing for the graphical element to be robustly marked in several locations.

Optionally, the edge portions are moved in a random fashion after the graphical element is marked, in order to prevent detection of the marking with standard and commercially available alignment software.

The method of the invention for marking graphical elements does not affect the commercial impact of the marked graphical elements, because their edges remain as smooth and clean as the corresponding edges of the original graphical element, and with the same colour contrast as before the marking.

In the present description, the term graphical elements includes text, brand names, logos or any other decoration or marking that can be found on products or packages. The term package is to be understood as a generic name including packages, objects, tags or any other part that can bear a graphical element.

BRIEF DESCRIPTION OF THE DRAWINGS

The invention will be better understood by reading the description below, illustrated by the figures, where.

DETAILED DESCRIPTION OF THE INVENTION

The method of the invention for marking graphical elements comprises the modification of one or more edges, or edge portions, of the graphical elements, as described below in more details with the example of a preferred embodiment. The description below further discloses a preferred embodiment of a method for detecting accordingly marked graphical elements.

Figure 1:
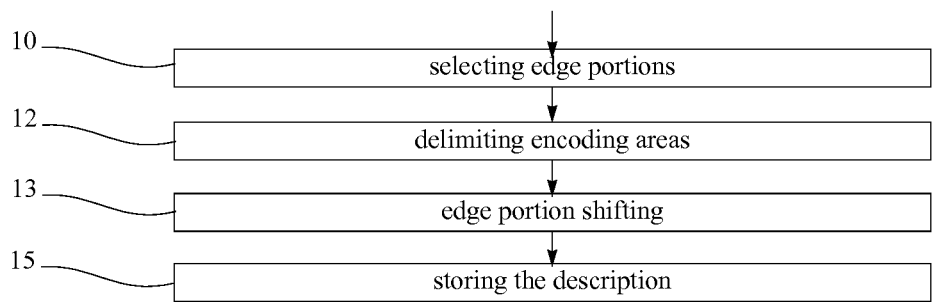
FIG. 1 illustrates steps of the method for marking graphical elements according to a preferred embodiment of the invention.

FIG. 1 is a flowchart representing steps of the method for marking graphical elements according to a preferred embodiment of the invention. Individual steps of the method are illustrated in more details in FIGS. 2 to 8.

According to this preferred embodiment, the method for marking graphical elements preferably comprises a first step of selecting edge portions 10.

Figure 2:
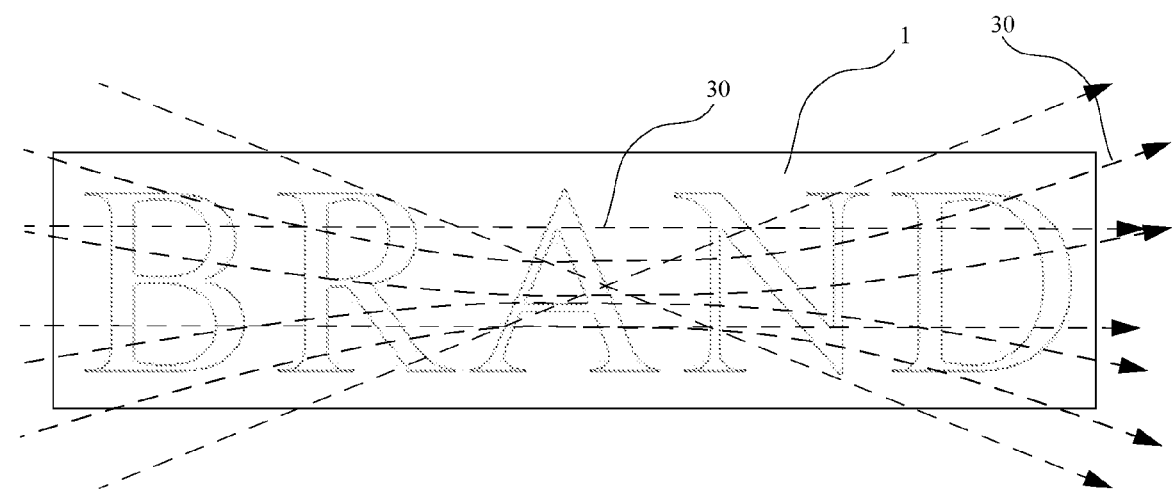
FIG. 2 illustrates how coherent edge portions are selected according to a preferred embodiment of the invention.

With reference to FIG. 2, the step of selecting edge portions 10 preferably comprises scanning a graphical element 1 to mark, preferably along a plurality of directions of scan 30, for analysing its edges in order to determine which edges or portion of edges could potentially be used for marking. Preferably, the graphical element 1 is in the form of an electronic file, for example a vector format file or a digital image file, and the step of scanning 10 is performed electronically on a computer with the help of an appropriate image processing software. Alternatively, the graphical element 1 is printed on a flat support, typically paper, or displayed on an electronic display, and the operation of scanning is performed partly or entirely manually.

Figure 3:
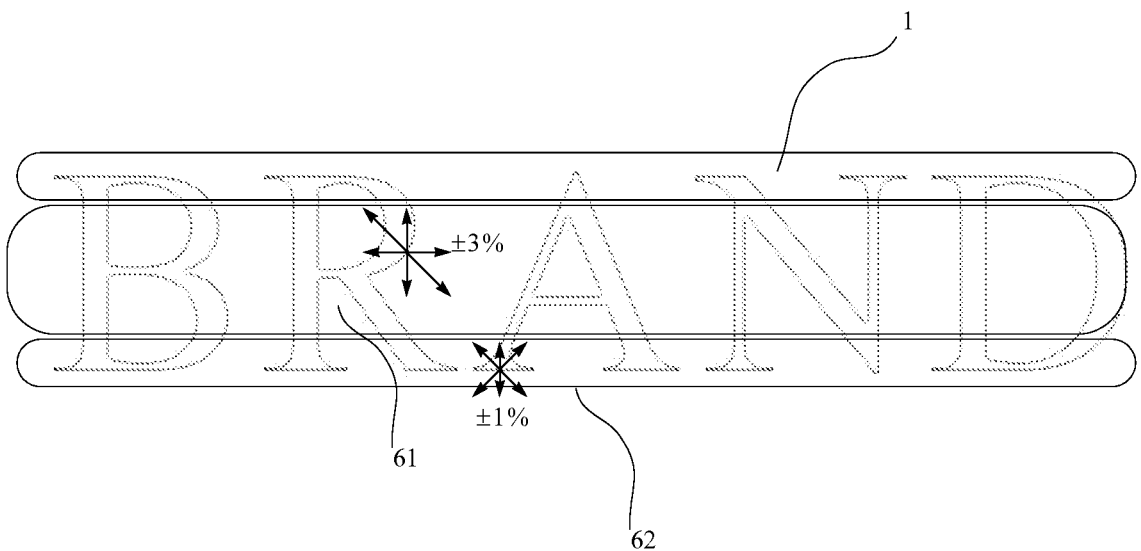
FIG. 3 shows areas of low and high visibility of a graphical element.

The human sight captures the axes of global alignment of characters and symbols in a graphical element and is particularly sensitive to modifications along these axes. With reference to FIG. 3, an estimation of the axes of alignment is preferably performed while scanning the graphical element 1 and zones of high visibility 62 are defined around these axes of alignment. At least one zone of low visibility 61 is then defined, comprising parts of the graphical element 1 that are not comprised in any zone of high visibility 62. The at least one zone of low visibility 61 is preferably complementary to the zones of high visibility 62 and thus essentially covers all parts of the graphical element 1 that are not covered by any zone of high visibility 62. Marking of the graphical element 1 is preferably not performed in the zones of high visibility 62 in order to avoid impacting the human visual perception of the graphical element 1.

As illustrated in FIG. 3, in a line of Latin text, for example, a displacement or a modification of an edge of the graphical element 1, or of a portion of an edge, in a zone close to the upper or lower border of the text, i.e. in a zone of high visibility 62, will be visible to the human eye even at a scale of less than 1% of the letter size. However, a displacement or modification of an edge or of an edge portion, in any direction in the zone of low visibility 61 will not be detected by a human eye up to a few percents, typically up to 3 to 5% of the letter size. Due to the nature of Latin letters, the zone of low visibility 61 happens to comprise mostly vertically oriented edges of the text.

The position, shape and size of the zones of low and high visibility greatly vary depending on the type and size of the graphical element. The position, shape and size of the zones of low and high visibility for example depend on the used alphabet in the case of text, on geometric and/or colour properties in the case of decorative elements such as logos, etc.

Figure 4:
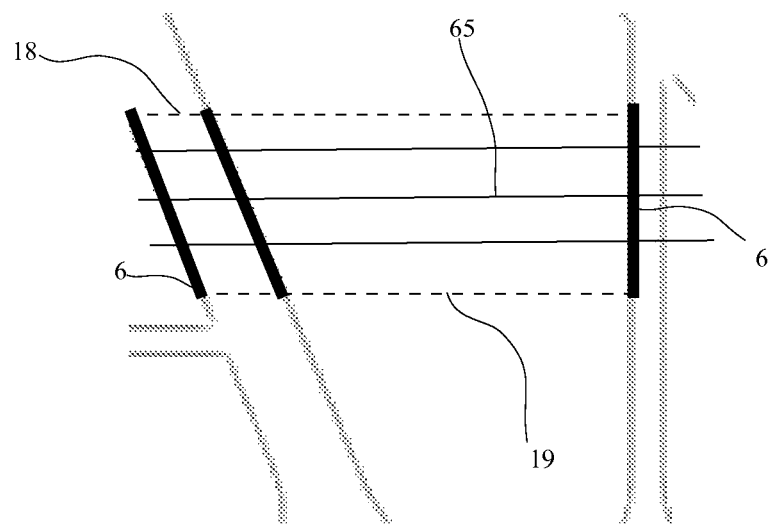
FIG. 4 shows examples of groups of coherent edges suitable for marking.
Figure 4:
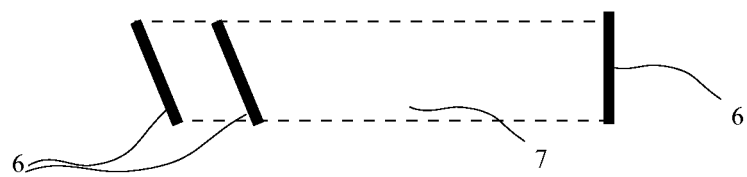
Figure 4:
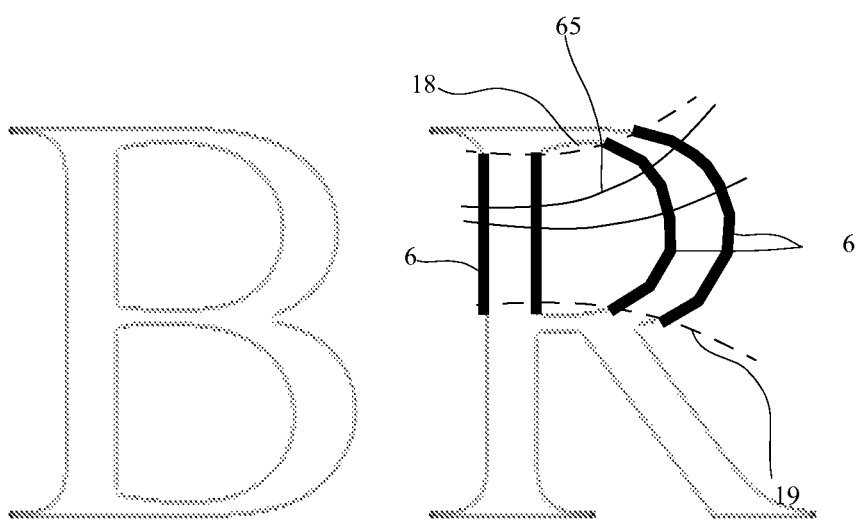

Marking a graphical element according to the method of the invention involves a plurality of preferably neighbouring edge portions exhibiting similar properties in a preferably compact area of the graphical element, as illustrated for example in FIG. 4. A preferred property is for example that edge portions 6 do not abruptly change their relative orientation. A plurality of edge portions 6 complying with the above is named hereinafter a group of coherent edge portions. In the examples illustrated in FIG. 4, the selected edge portions 6 of each group of coherent edge portions keep their orientation essentially constant relative to each other along their entire length, as for example in the upper images, and/or their relative orientation smoothly varies along their length, as in the lower image.

Furthermore, in order to ensure robustness to the marking and enough redundancy during detection, the length of each selected edge portion 6 is preferably longer than or equal to a predefined minimum length. The minimum length depends for example on the letter size, the edges sharpness, and/or to other characteristics of the graphical element.

According to a preferred embodiment, the step of selecting edge portions 10 comprises analyzing preferably the zone of low visibility 61 of the graphical element 1 and searching for pairs of edge portions that exhibit an essentially constant and/or smoothly varying orientation relative to each other, preferably parallel edges, on a length at least equal to the predefined minimum length. In the examples of FIG. 4, such edge portions are the parallel edge portions 6 of the letter "A" in the upper image and the parallel edge portions 6 of the letter "R" in the lower image. Analyzing the graphical element and selecting edge portions for marking is preferably performed electronically, for example with the help of an appropriate image processing software running on a computer. This can however be performed at least partly manually within the frame of the invention.

Once a pair of edge portions 6 is found, one or more neighbouring edge portions 6 close to this pair of edge portions are selected that form a group of coherent edge portions with the initial pair of edge portions 6. The one or more neighbouring edge portions 6 are thus preferably of a constant and/or smoothly varying orientation relative to other edge portions 6 of the group, as illustrated for example in FIG. 4.

According to a preferred embodiment of the invention, the number of coherent edge portions required for marking a graphical element depends on the surface on which the graphical element is or will be applied. If the surface is flat, three coherent edge portions are sufficient for encoding one bit of information, as shown in the example in the upper image of FIG. 4. If the surface is curved, each encoding area preferably comprises four coherent edge portions, independently of the absolute value of the curvature.

Once three or more coherent edge portions 6 are selected, a family of smooth and non-intersecting curves 65 are defined, wherein all curves 65 intersect all edge portions 6 of the corresponding group of coherent edge portions. Preferably, all curves 65 of the family of curves cut a same edge portion 6 at a same angle. Preferably, this angle is as close as possible to a right angle of 90°. In the example of FIG. 4, the curves 65 in the upper image are parallel straight lines, while the curves 65 in the lower image are diverging curves of second order. The curves 65 are only construction curves that are used as explained further for marking the graphical element. They are preferably not visible on a printed graphical element marked according to the method of the invention. The shape and/or mathematical representation of the curves 65 of each encoding area 7 of a graphical element is however stored and used for marking the graphical element and detecting the marking in a marked graphical element according to the invention.

Areas of the graphical element covering a group of coherent edge portions 6 suitable for marking according to the invention and a corresponding family of curves 65 are hereinafter referred to as encoding areas 7. An encoding area thus comprises a group of coherent edge portions of for example three, four or more coherent edge portions. The encoding area 7 is typically a quadrilateral limited on two opposite sides by two of the selected edge portions 6 and on two other opposite sides by curves 65 of the corresponding family of curves.

For the sake of simplicity, it will be assumed in the examples of FIG. 4 that the selected edge portions 6 are essentially vertical, while the corresponding curves 65 are essentially horizontal. The encoding area 7 is thus limited on the left and on the right each by an edge portion 6 and at the top and bottom each by a corresponding curve 18, 19. The upper curve 18 and the lower curve 19 correspond to the limits within which the selected edge portions 6 have essentially constant and/or smoothly varying relative geometric properties. These limits are for example defined by the points where at least one of the edge portions in the group looses its property of constant and/or smoothly varying orientation relative to the other edge portions of the group, or where the orientation of at least one of the edge portions quickly varies relative to the other edge portions along its length, as for example in the lower image of FIG. 4.

Figure 9:
FIG. 9 illustrates how information about encoding areas is stored according to a preferred embodiment of the invention.

The size of the encoding area 7 between the upper and the lower limit directly affects the robustness of decoding the information encoded in the marked encoding area. The encoding area 7 is therefore preferably as large as possible within the zone of low visibility of the graphical element. The minimal size of the encoding area depends in particular on the precision of the tools (scanner, image processing tool, etc.) used in the detection method described further below. Typically, the size of the encoding area is a few percent of the whole graphical element. Examples of encoding areas are illustrated in FIG. 9. Encoding areas in a same graphical element preferably do not overlap each other in order to avoid double marking of the same edge portion.

Figure 5:
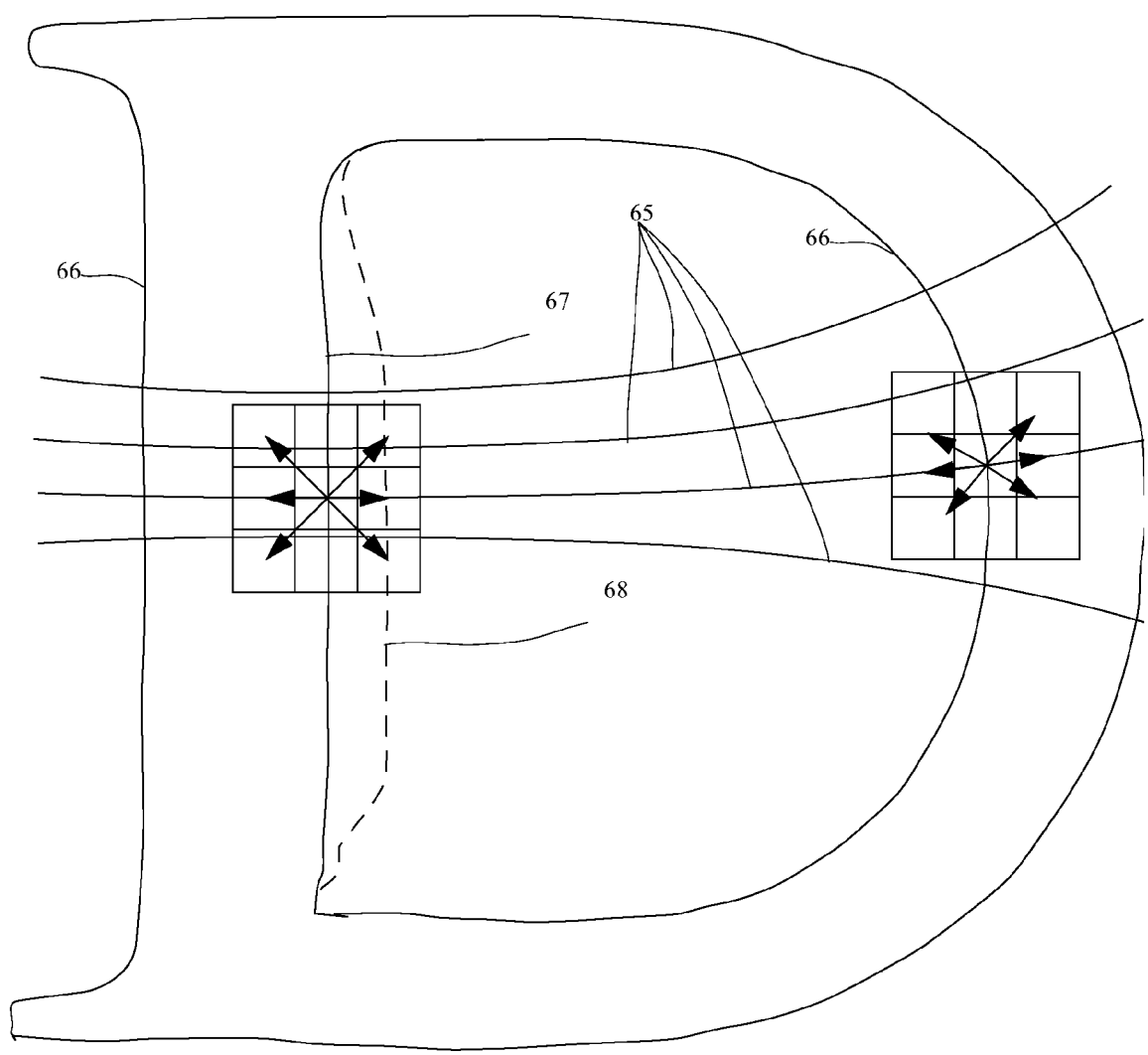
FIG. 5 illustrates the definition of a family of curves according to a preferred embodiment of the invention.

With reference to FIG. 1, the method of the invention for marking graphical elements further comprises a step of edge portion shifting 13. With reference to FIG. 5, if the graphical element to be encoded is intended to be applied on a flat surface, preferably three coherent edge portions will be considered in each encoding area. A first edge portion, for example the first edge portion of the corresponding group of coherent edge portions in the direction of scan, is used as a reference edge portion 66. A second edge portion, for example the second edge portion in the direction of scan, is used as an edge portion to mark 67. A third edge portion, for example the third edge portion in the direction of scan, is used as a reference edge portion 66 again.

When encoding or marking the graphical element, both reference edge portions 66 will remain unchanged and be used as a geometrical reference. The edge portion to mark 67 will be moved and thus transformed into the modified edge portion 68 to reflect the marking of the graphical element, thereby encoding a piece of information in the graphical element.

Figure 6:
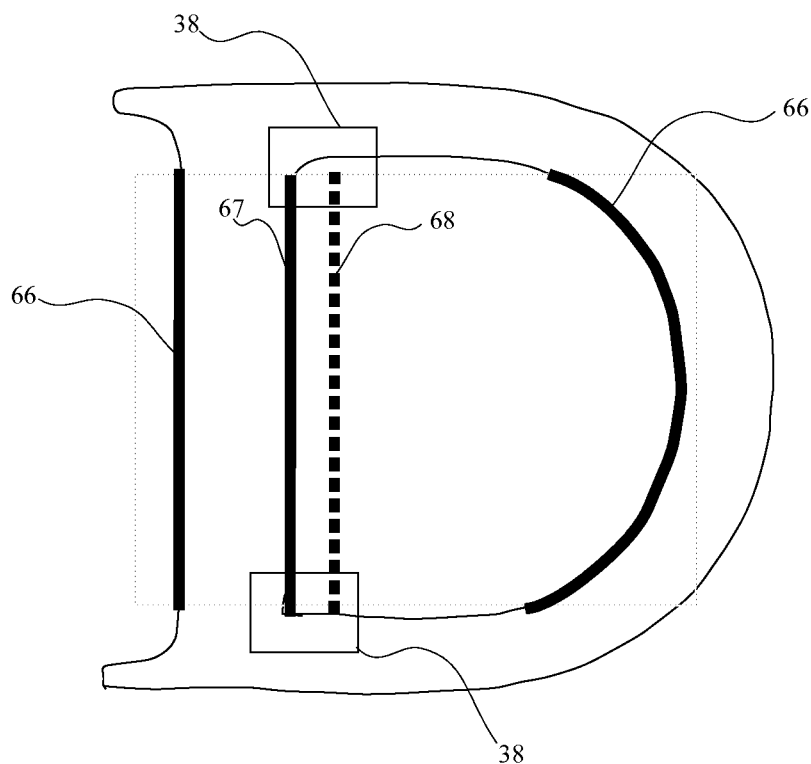
FIG. 6 shows the marking of an edge portion according to a preferred embodiment of the invention.
Figure 6:
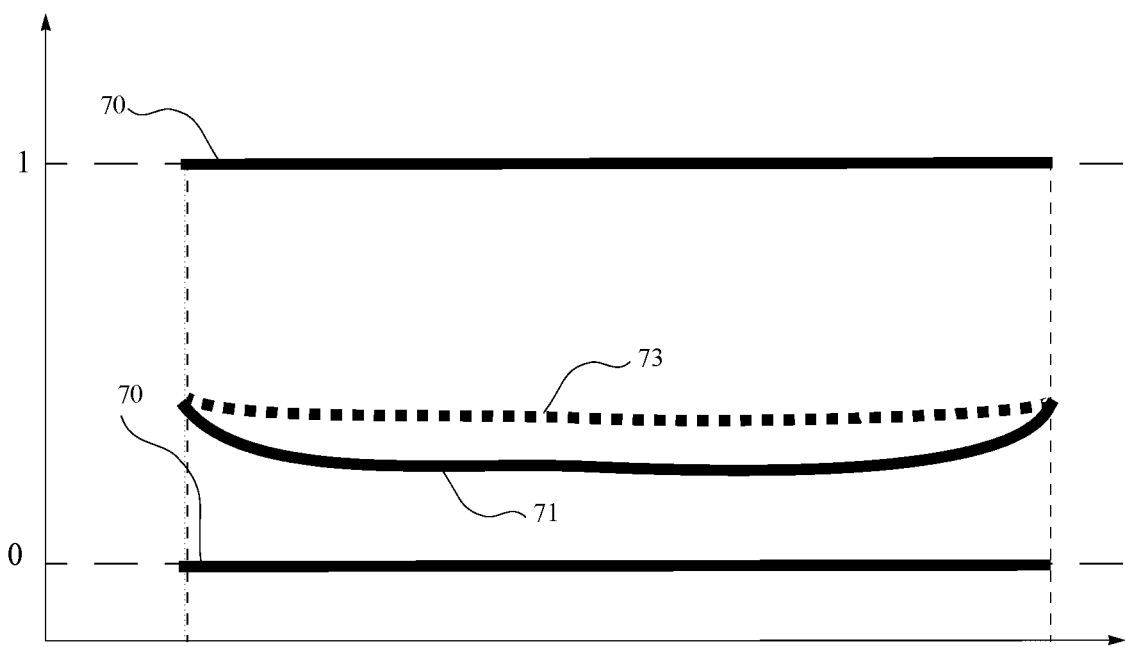

The edge portion to mark 67 is preferably modified according to the procedure of relative curve deformation illustrated in FIG. 6. For the sake of visibility, the deformation is exaggerated with respect to the letters size. The edge portion to mark 67 is shifted along the curves of the corresponding family of curves. Each point of the edge portion to mark 67 is thus moved by a determined distance in a determined direction along the curve 65 intersecting the edge portion to mark 67 at this point. All points of the edge portion to mark 67 are shifted in the same direction. The shifting distance is preferably the same for all points of the edge portion to mark 67. Alternatively, the shifting distance of each point of the edge portion to mark 67 is a predetermined percentage, for example up 3% or 5%, of the length of the corresponding curve 65 within the encoding area.

The edge portion to mark 67, which after shifting becomes the modified edge portion 68, is preferably as distant as possible from its original position to provide robustness of detection, preferably however without producing any visually disturbing effect on the marked graphical element. The edge portion to mark 67 being shifted along a family of smooth nonintersecting curves that intersect all edge portions of the corresponding group, the resulting modified edge portion 68 essentially keeps the same form as the original edge portion to mark 67.

The upper image in FIG. 6 shows a part of the original graphical element, which, in this particular example, is a letter with the reference edge portions 66, the edge portion to mark 67 and the modified edge portion 68 in dotted line, in the so called direct domain. The lower image of FIG. 6 shows these same elements in the normalized domain. The limits of the encoding area are the reference edge portions 66 on each side in the direct domain. The reference edge portions 66 are transformed along the corresponding family of curves into the normalized domain, into the normalized reference edge portions 70 corresponding to the normalized values 0 and 1, respectively.

The edge portion to mark 67 similarly corresponds to the normalized edge portion to mark 71, while the modified edge portion 68 corresponds to the normalised modified edge portion 73.

The result of the marking of the graphical element in the example encoding area, i.e. the bit of information encoded in this encoding area, corresponds to the difference between the position of the normalized edge portion to mark 71 and the position of the normalized modified edge portion 73 in the normalized domain and to the difference between the position of the edge portion to mark 67 and the position of the modified edge portion 68 in the direct domain.

The normalization of the edge portions of the encoding area allows a clear representation and/or determination of their relative positions rather than the representation of the absolute distance separating them. This representation is preferably used also when verifying and/or detecting and/or decoding the marking in a marked graphical element, because it allows removing any influence of any transformations occurred to the support bearing the marked graphical element, for example stretching or shrinking of a paper or plastic support due to moisture, printing, gluing, exposure to sunlight, etc. The normalization of the encoding area further allows removing any distortion due to unknown optical parameters of a camera used for capturing the marked graphical element. Scaling of the graphical element in any direction will not alter the detection criteria.

Figure 7:
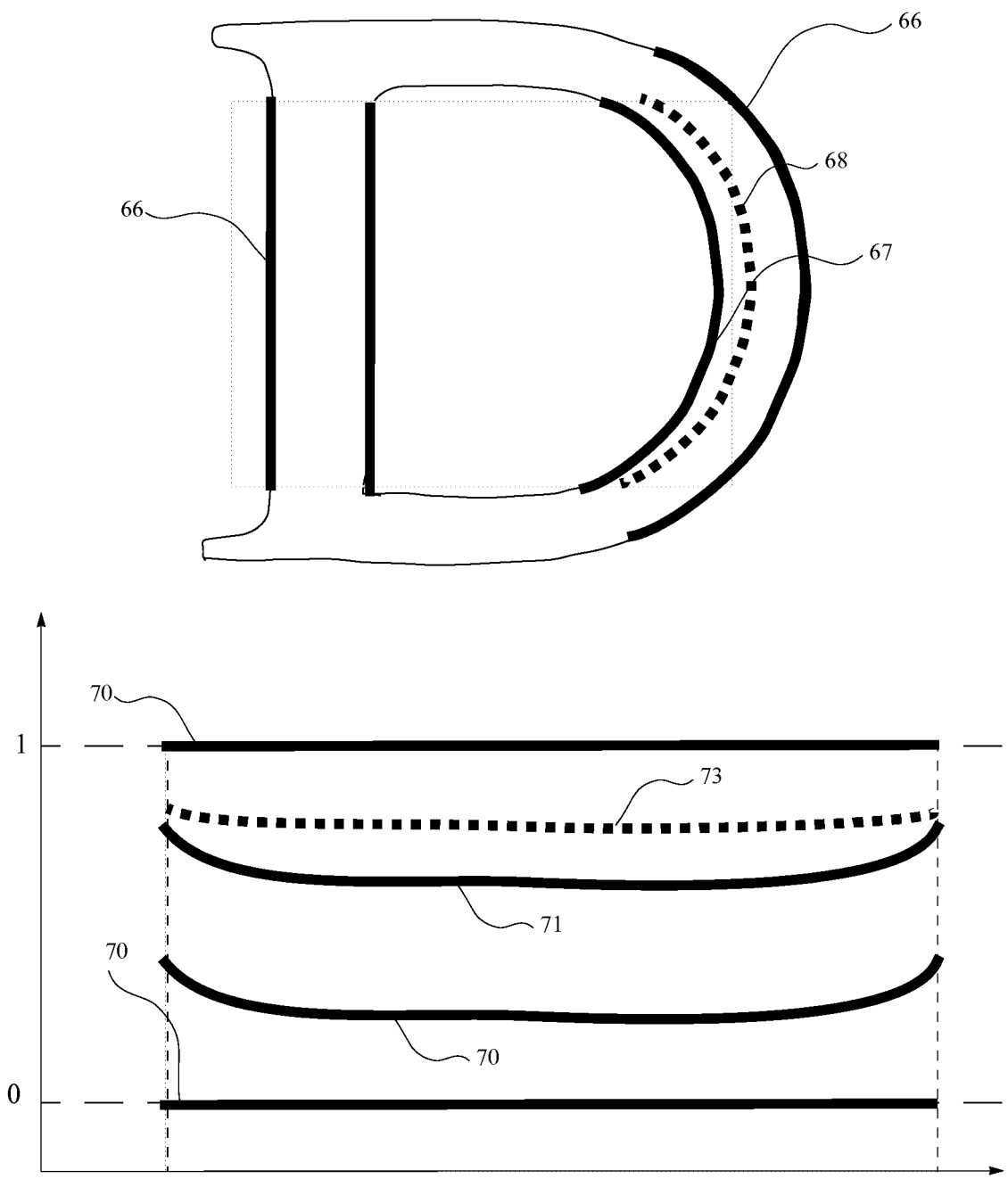
FIG. 7 shows the marking of an edge portion for non-flat surfaces according to a preferred embodiment of the invention.

If the marked graphical element is meant to be applied on a curved support, the number of coherent edge portions involved in the marking is preferably four, as illustrated in FIG. 7. In this case three reference edge portions 66 and for example one edge portion to mark 67 are used, the marking comprising the transformation of the edge portion to mark 67 into a modified edge portion 68. In the normalized domain, three normalized reference edge portions 70 corresponding to the reference edge portions 66 of the direct domain allow compensating for transformations of the support of the marked graphical element mentioned earlier, and additionally allow compensating for the unknown curvature of the surface. The normalization is done by setting exterior reference edge portions 70 to 0 and 1 in the normalized space.

A transformation in the direction of the known family of curves of the encoding area is for example applied to the corresponding coherent edge portions 66, 67 as found on the captured image of the curved marked graphical element, in order to match the exterior reference edge portions 66 to 0 and 1 in the normalized space. The relative position of the thus transformed third and middle normalized edge portion 70 relative to the exterior normalized reference edge portions 70, i.e. relative to 0 and 1, and its difference to its target position corresponding to its relative position when the marked graphical element is applied on a flat surface, one can determine a correction factor depending on the curvature of the support of the graphical element. This correction factor is then applied to the normalized modified edge portion 73 in order to detect the marking and/or decoding it.

In a variant embodiment, a non-linear transformation in the direction of the known family of curves is applied to all captured coherent edge portions of the graphical element, such that all three reference edge portions correspond to their target transform in the normalized domain. Applying this same non-linear transformation to the captured modified edge portion allows directly obtaining in the normalized domain a normalized modified edge whose position is free of any influence of the curvature of the surface and other possible transformations of the support of the marked graphical element.

Marking of the graphical element by modifying edge portions along the corresponding nonintersecting smooth curves in the encoding area only could lead to some visible effects at the border of the encoding area, for example in the junction areas 38 as indicated in the upper image of FIG. 6. In order to avoid such effects, the modification of the edges in the junction areas 38 is preferably adapted in order to preserve the smoothness of the edge before and after the marking. If necessary, for example if the marking generates highly curved modified edges in the junction area 38, the edge is slightly modified also outside the encoding area.

Every edge portion to mark 67 can be shifted from its original position in two opposite directions along the constructed curves 65. Therefore, with reference to FIG. 9, each encoding area 7 comprising one edge portion to mark can store three values of information in its simplest case. Encoding a number into a marked graphical element for example corresponds to a conversion of that number into a base of three and encoding each digit of the obtained number in another encoding area 7. Each encoding area can bear from one to several bits of information, depending on the number of edge portions to mark present in the encoding area.

Figure 8:
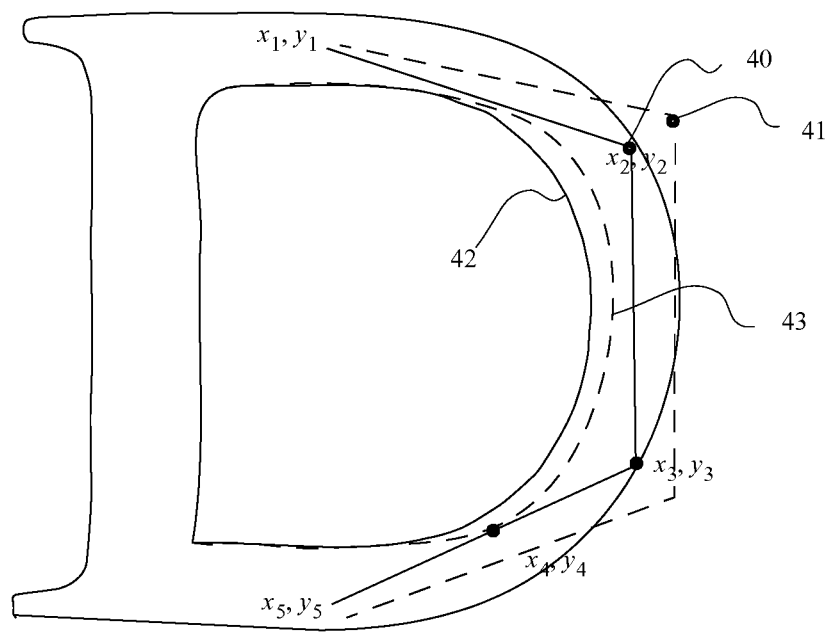
FIG. 8 illustrates an example of edge shifting according to the invention, using the spline modification.

The edge portion shifting is for example performed with a digital edge portion representation which is a variant of vector spline representation (or any other curve representation with polygon of control points or curve tangent points). The control points of the edge portions in vector format that define elements of the encoding area are modified as shown in FIG. 8. The original vector curve 42 is controlled by the position of the original control point 40. By displacing the latter and obtaining the modified control point 41, the edge portion will take a new position and be modified into the modified spline edge portion 43. The deformation of the edge portion in the normalized domain is thus transformed into a deformation in the direct domain and in turn into a deformation in the space of control points and their tangents. The marking is retained and the curve is stored preferably in that latter form.

The method of the invention for marking graphical elements preferably comprises a further step of storing the description 15 illustrated in the flowchart of FIG. 1, in which the complete information about each encoding area is stored in a descriptor of the graphical element that is used for example at the detection phase in order to retrieve the information contained in the marked graphical element. In that descriptor, every encoding area 7 is for example characterized by a number corresponding to the number 37 of the encoding area as illustrated in the second image of FIG. 10, and by a polygon outlining this encoding area, wherein the coordinates of the vertices are for example expressed in a coordinate system relative to a predefined origin 39 of the graphical element. Every encoding area 7 contains at least one edge portion to mark 67. The information about which encoding area corresponds to which part of the encoded information is preferably stored as well in the descriptor.

The encoding areas together with the whole frame of the graphical element, thus forming the original template 44 with the encoding areas, are preferably also saved as part of the descriptor.

Optionally, a further step of randomly moving edges and/or parts, for example characters, of the graphical element is applied to the marked graphical element in order for example to mislead counterfeiters. In this step, edges and other parts of the graphical element are moved in a random fashion while preserving the invariant properties of the marking, i.e., edge portions belonging to a same group of coherent edges are not moved relative to each other. This is done to avoid giving hints to unauthorized third parties on how to locate edge portion displacements corresponding to encoded information by a simple alignment of two designs coming from different boxes. Information about this random displacement, if applicable, is also preferably stored in the descriptor.

2. Detecting the Marking

Figure 10:
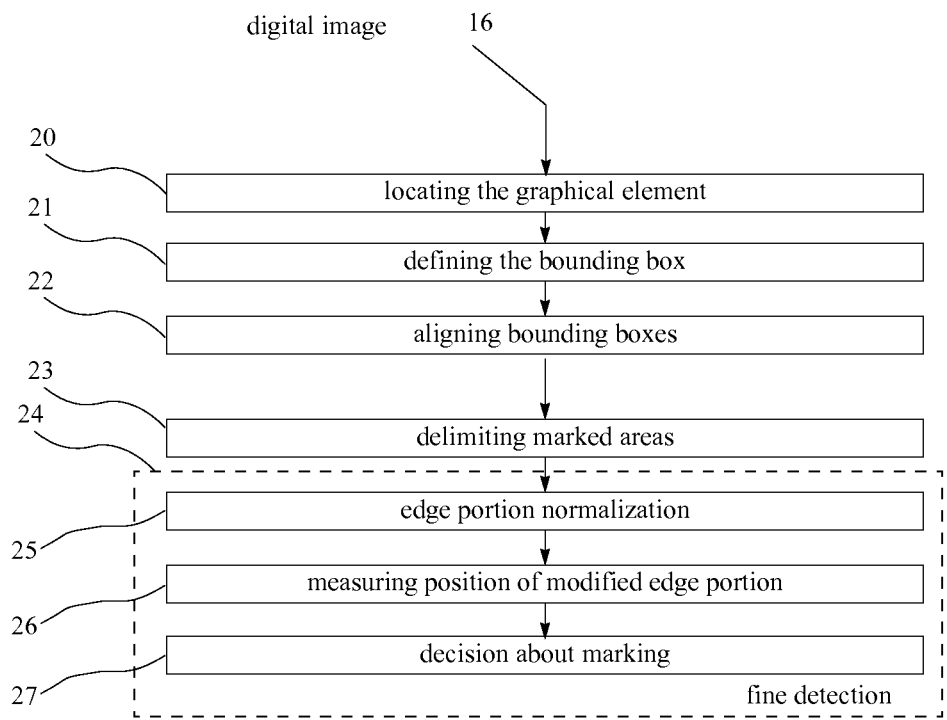
FIG. 10 illustrates steps of the method for detecting said marking according to a preferred embodiment of the invention.
Figure 11:
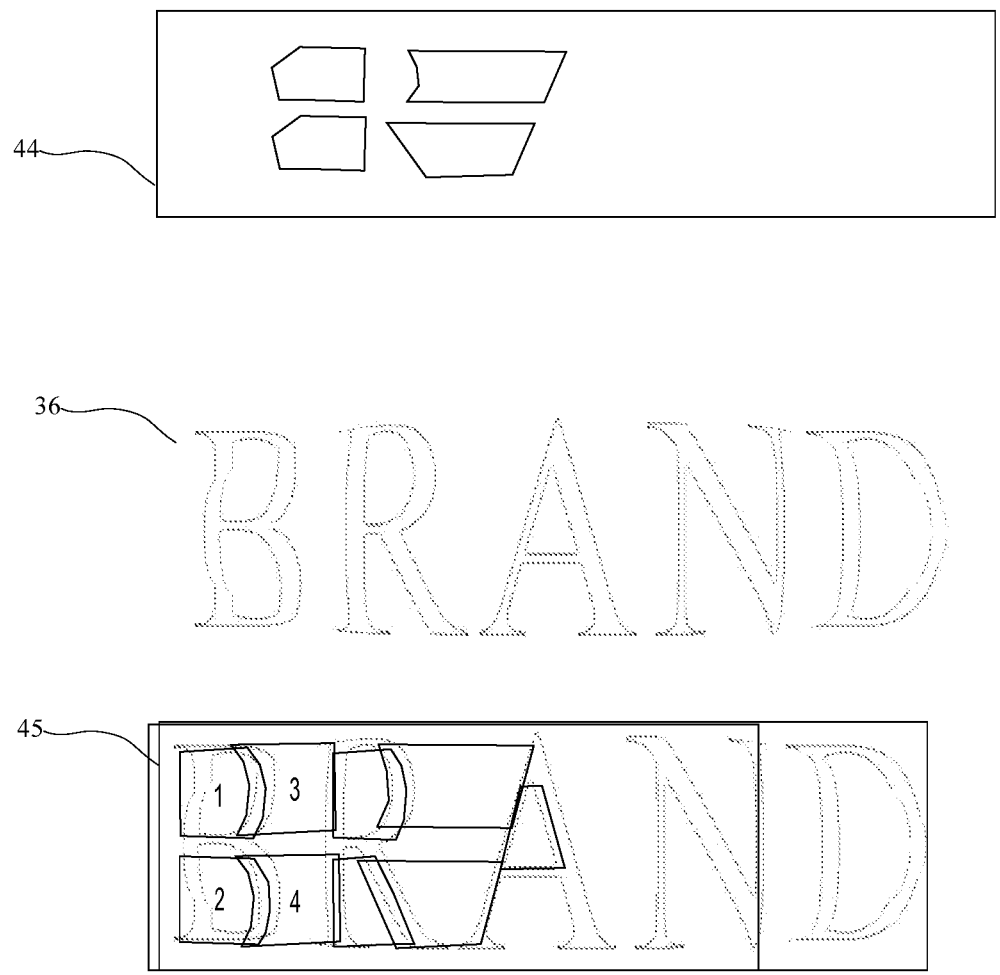
FIG. 11 is an example of the alignment of a captured marked graphical element with the corresponding original graphical element.
Figure 12:
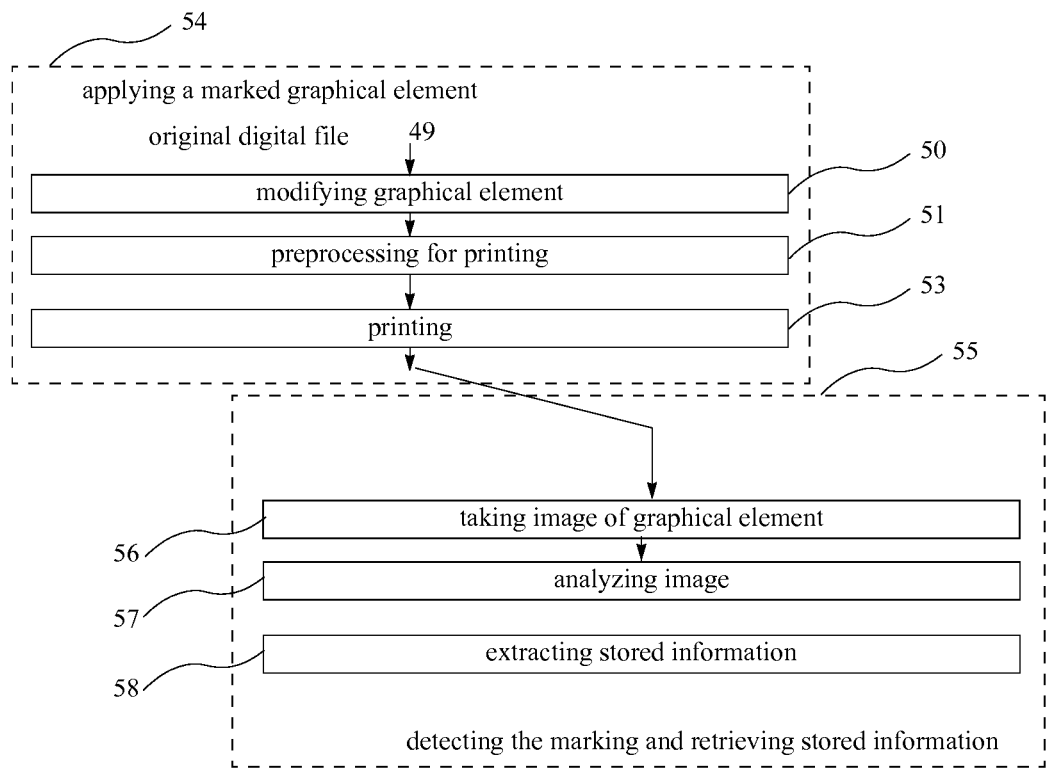
FIG. 12 illustrates the steps of a typical methods for applying a marked graphical element and for detecting the marking and retrieving the information stored in the marked graphical element.

Steps of a preferred embodiment of the method of the invention for detecting a marked graphical element are represented in the flowchart of FIG. 10 and illustrated in FIG. 5, FIG. 6 and FIG. 11.

A first step of the method is preferably a step of approximately locating the graphical element 20 in a digital image 16. The digital image 16 is for example an image of a product bearing the marked graphical element taken with a digital camera, for example with the digital camera of a portable device such as a mobile phone, or any other suitable camera. The step of approximately locating the graphical element 20 is preferably realized by any suitable state of the art technique.

Once the marked graphical element is located in the digital image 16, a next step of defining the bounding box 21 allows establishing an approximate standard coordinate system around the located graphical element. Only approximate alignment of the captured graphical element relative to a representation of the original graphical element, known for example from: its descriptor, is performed at this stage.

In a following step of aligning bounding boxes 22 shown in FIG. 10, the approximate standard coordinate system is put into correspondence with the original coordinate system of the graphical element, known for example from its descriptor, in order to align the encoding areas where marking was possibly performed. The original template 44 is aligned with the bounding box 36, as shown in FIG. 11. Areas where the graphical element was marked are superimposed on the places where marking should be present in the thus constructed aligned template 45.

Based on the alignment, in a next step of delimiting marked areas 23, the outlines of the encoding areas are applied on the captured digital image as shown in FIG. 11.

In order to precisely determine the position of the marked curves, and thus retrieving the information stored therein, an optional step of fine detection 24 is preferably performed. This step is illustrated on FIG. 6. Since the position of the modified edge portion varies according to the information that is encoded in the graphical element, only the position of the reference edge portions is known. The step of fine detection 24 thus starts with the edge portion normalization 25 illustrated on FIG. 6, wherein the reference edge portions 66 that are on both sides of the modified edge portion are transformed to correspond to the normalized reference edge portions 69 representing the values 0 and 1.

Once the normalized form of the edge portions is obtained, a step of measuring the position of the modified edge portion 26 is performed, in which the relative position of the normalized modified edge 73 in the normalized domain is estimated. An optional step of decision about marking 27 is preferably performed for each encoding area where a shifting of the modified edge portion relative to the original edge portion to mark was detected. In the step of decision about marking 27, the position of the modified edge portion measured in the previous step is compared to the corresponding position of the original edge portion to mark and the value of the encoded bit of information is determined based on the amplitude and/or direction of the relative position difference.

The invention claimed is:

1. A method for marking graphical elements comprising the steps of:
    estimating axes of alignment of characters and symbols in said graphical element;
    defining zones of high visibility around these axes of alignment;
    defining at least one zone of low visibility comprising parts of said graphical element that are not comprised in any of said zones of high visibility;
    selecting at least three coherent edge portions of said graphical element in said at least one zone of low visibility, such that the relative orientation of said coherent edge portions is constant or smoothly varies along their entire length, said at least three coherent edge portions comprising at least two reference edge portions and one edge portion to mark located between said at least two reference edge portions;
    defining a family of smooth and non-intersecting curves, said curves intersecting all of said at least three coherent edge portions;
    defining an encoding area comprising said at least three coherent edge portions and said curves, said encoding area being limited on two opposite sides by said at least two reference edges portions and on two other opposite sides by curves of said family of curves;
    shifting said edge portion to mark along said curves relative to said at least two reference edge portions; and
    storing information about said at least one encoding area in a descriptor of said graphical element.

2. The method of claim 1, wherein said at least one encoding area comprises four coherent edge portions, said four coherent edge portions comprising three reference edge portions and one edge portion to mark located between two of said three reference edge portions.

3. The method of claim 1, wherein said graphical element comprises text and said at least three coherent edge portions are parts of a same character of said text.

4. The method of claim 1, wherein said graphical element comprises text and said at least three coherent edge portions are parts of two neighbouring characters of said text.

5. The method of claim 1, wherein the previously set forth steps are repeated at least one more time.

6. The method of claim 1, wherein a distance of shifting said edge portion to mark is smaller or equal to 5% of the largest overall dimension of said graphical element.

7. The method of claim 1, wherein a distance of shifting said edge portion to mark is smaller or equal to 3% of the largest overall dimension of said graphical element.

8. The method of claim 1, further comprising a last step of randomly displacing edges of said graphical element, wherein said at least three coherent edge portions are not moved relative to each other.

9. A method for detecting a marking in a graphical element, comprising the steps of:
- providing a descriptor of a graphical element defined according to the method of claim 1;
- locating said encoding area in a digital image of said graphical element;
- retrieving said at least two reference edge portions and said at least one modified edge portion of said encoding area in said digital image;
- determining the relative position of said modified edge portion relative to said reference edge portions, said step of determining the relative position of said at least one modified edge portion comprising transforming said at least two reference edge portions and said at least one modified edge portion into a normalized domain wherein the position of a first one of at least two normalized reference edge portions corresponds to 0, a second one of at least two normalized reference edge portions corresponds to 1, and the value corresponding to the position of a normalized modified edge portion between said first one and second one of at least two normalized reference edge portions determines the relative position of said at least one modified edge portion.

10. The method of claim 9, wherein said step of retrieving comprises retrieving at least three reference edge portions of said encoding area in said digital image.

11. Non-transitory computer-readable medium encoded with instructions for performing the method of claim 1 when loaded on a computing device.

12. Non-transitory computer-readable medium encoded with instructions for performing the method of claim 9 when loaded on a computing device.

13. A mobile computing device with a camera programmed for performing the method of claim 9.

* * * * *

UNITED STATES PATENT AND TRADEMARK OFFICE
CERTIFICATE OF CORRECTION

| | |
|---|---|
| PATENT NO. | : 8,885,947 B2 |
| APPLICATION NO. | : 13/820807 |
| DATED | : November 11, 2014 |
| INVENTOR(S) | : Sergei Startchik |

It is certified that error appears in the above-identified patent and that said Letters Patent is hereby corrected as shown below:

In the Specification

Column 7, line 23, After the word letter, Please insert --"D"--.

Signed and Sealed this
Tenth Day of March, 2015

Michelle K. Lee
*Deputy Director of the United States Patent and Trademark Office*